Jan. 3, 1961  C. W. CHILLSON  2,966,805
MECHANICAL SERVO MECHANISMS
Filed Aug. 20, 1956  3 Sheets-Sheet 1

INVENTOR
CHARLES W. CHILLSON
BY
Godfrey B. Spein
ATTORNEY

Jan. 3, 1961  C. W. CHILLSON  2,966,805
MECHANICAL SERVO MECHANISMS
Filed Aug. 20, 1956  3 Sheets-Sheet 2

INVENTOR
CHARLES W. CHILLSON
BY
Godfrey B. Spein
ATTORNEY

Jan. 3, 1961  C. W. CHILLSON  2,966,805
MECHANICAL SERVO MECHANISMS
Filed Aug. 20, 1956  3 Sheets-Sheet 3

INVENTOR
CHARLES W. CHILLSON
BY
Godfrey B. Spein
ATTORNEY

United States Patent Office 2,966,805
Patented Jan. 3, 1961

2,966,805

MECHANICAL SERVO MECHANISMS

Charles W. Chillson, Packanack Lake, N.J., assignor to Curtiss-Wright Corporation, a corporation of Delaware Filed Aug. 20, 1956, Ser. No. 605,015

23 Claims. (Cl. 74—388)

This invention relates generally to screw and nut mechanisms and more particularly provides an all-mechanical servo mechanism or force amplifier wherein powerful forces and motions from a continuously operating power source may be precisely controlled by minute control forces.

Very broadly, the invention comprises a continuously operating power input member, a control device requiring very light effort to move it, a power output member to which input power is selectively applied by operation of the control device, and mechanism whereby the output member is constrained to follow a determined function of the movement of the control device. The system may be arranged to operate in either of two directions, selectively, and to move a driven load applied on the system in either of two directions.

Servo systems to attain the result indicated, are not new per se. They are used in many environments and may operate on electrical, hydraulic, pneumatic, electronic or mechanical principles. Mechanical servo systems, in which category the present invention lies, usually incorporate friction clutches or the like for power transmission, the clutches being actuated by relatively small control forces.

In the present invention, the servo mechanism is all mechanical, and is free from friction devices or clutches. Rather, the invention operates broadly on the basis of a driven member moved or held alternately by two transmitting elements. While one transmitting element is in fixed relation to the member and holds or forces the member to move by a power device, the other element is free on the member and is moved relative thereto by the control device, making ready for the next load supporting or moving phase by said other element. Between phases, the load is transferred from one element to the other. By appropriate control of the elements during their free intervals on the member, shift of the driven member is controllable to any desired degree. By other mechanical devices to be described, the member may be selectively moved in either direction. The invention is arranged so that for any movement of the control device, the driven member is moved therewith.

The invention is particularly useful as a servo-actuator for auxiliary mechanisms in powerplants, where mechanical power is available in close proximity to the auxiliary mechanism requiring controlled power.

The mechanism of the invention is readily constructed as a compact, unitary assembly, is positive in action, has small time lags, and, because of its all-mechanical, unitary nature, is highly dependable and free from failure liability. It is believed to be more rugged and dependable than other systems as it is free from fallible subsystems. Further, it may be made inherently irreversible in action and is, therefore, fail-safe. That is, should any of the control or power input components fail, the basic device will hold the output member at the position it occupied before failure occurred, without moving or drifting to some other position as a result of the extraneous forces acting on the output member. Thus, brakes or other deterrents to reverse action of the mechanism are not needed.

There are many possible alternatives in the mechanical design of my system or mechanism. A few have been chosen for illustration and description herein, and it will be seen, as the description proceeds, that the basic features of the invention appear in all of them. It should be understood that the different arrangements shown are exemplary and are non-limiting as to the scope of the invention.

Objects of the invention appear in part from the foregoing general statement and others will become apparent as the description proceeds.

Broadly, the invention incorporates a continuously reciprocating power input member, a control device which is selectively adjustable, transmitting elements controlled by the device, and an output member which is selectively driven by the controlled transmitting elements. While these elements and members may take different forms, the transmitting elements are preferably nuts, and the output member is preferably a screw engaged and translated by the nuts. The terms nuts and screw will be used hereafter for these components but should be liberally construed to cover equivalent elements having the same functional effects, such as wedges, cams and followers and ratchet devices.

Figs. 1–6 show a simplified form of the invention to illustrate the principles of the invention. These serve as groundwork to enable understanding of the more complex and useful forms of the invention shown in subsequent embodiments.

Figure 1:
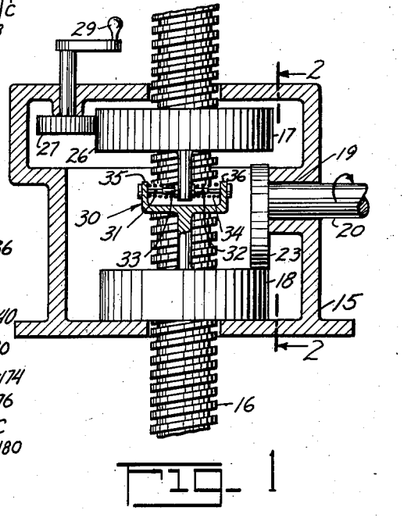
Fig. 1 is a section through a simple form of the invention.

Referring to Fig. 1, a fixed cage 15 is shown, through which passes a non-rotating translatable screw 16. Within the cage are nuts 17 and 18 threaded on the screw and spaced apart from each other, each being capable of resting against an adjacent part of the cage 51. Journalled in a side face of the cage 15 at 19 is a shaft 20, the shaft being rotated continuously and carrying at its inner end a cam or eccentric 22.

Conveniently, the eccentric 22 carries a rim 23 journalled on the eccentric through balls 24. Thus, the rim 23 may move orbitally without rotation as the shaft 22 rotates. The rim 23 is the power reciprocator which may, at times, be brought into driving engagement with one or the other of the nuts 17 or 18 as will be described. This constitutes an easily understandable form of power reciprocator; it may be replaced by other forms as will appear later in the description.

Either nut 17 or 18 may be controlled directly. As shown, nut 17 is controlled directly, and nut 18, indirectly. The rim of nut 17 is formed with gear teeth 26 engaged by a pinion 27 controllably rotatable by any suitable means such as a hand crank 29. Nuts 17 and 18 are resiliently coupled together by an assembly 30 comprising elements 31 and 32, springs 33 and 34 and stops 35 and 36, whereby the nuts may be relatively rotated to an extent limited by the stops, but are continually urged to a certain relative "centered" attitude by the springs. The latter are precompressed to hold the nuts in the "centered" attitude.

At intervals when the reciprocator rim 23 is disengaged from nut 17 or when the nut 17 is not in load-bearing contact with the cage 15, the nut may be rotated in either direction by the crank 29 to bring about intermittent or pulsing axial travel of the screw 16 in either direction, during either downward or upward loading of the screw 16, as will be described in detail.

Figure 3A:
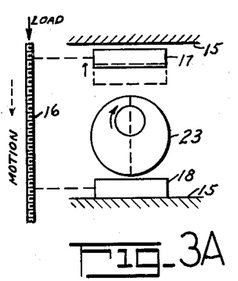
Figs. 3A through 3D are diagrams showing the sequence of the operation of the mechanism of Fig. 1 with a down load on the screw and control for lowering of the screw.
Figure 3B:
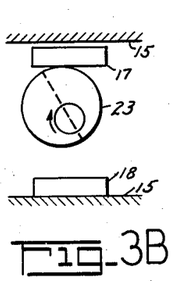
Figure 3C:
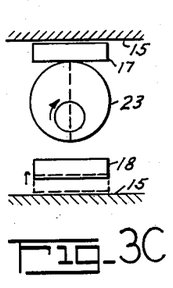
Figure 3D:
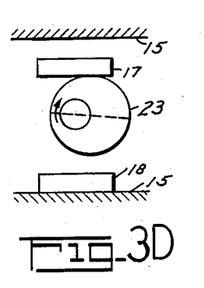

Figs. 3A–3D show the relative motions and position relations of the elements, where the load is down on the screw, and the load is to be lowered. Figs. 3A shows the start of the cycle, wherein the nut 18 supports the load, resting on the cage 15. The nut does not rotate when supporting the load. The normal position of nut 17 is shown in dotted lines, where it is coordinated by the centralizing assembly 30 with the rotational position of nut 18 (when crank 29 of Fig. 1 is free). If the nut 17 remains in the dotted line position, rim 23 as it orbits will lift it and let it down intermittently, the load being held or supported by the nut 18 when not beng supported by the nut 17. During the interval when the nut 17 is free of load, it may be fully screwed up to the full line position to the limit (established by the assembly 30) of its angular movement relative to nut 18. This rise is dimensionally controlled so that the nut 17 is engaged by the rim 23 near the top of its travel as in Fig. 3B. The nut 17 is thus raised slightly, and through the screw 16, lifts the load and the nut 18 from the cage 15. As the nut 18 is unloaded, it is free to turn, and is turned as in Fig. 3C, to rise to the solid line position (by the action of the springs in centralizer 30). Now, as the rim 23 continues to rotate, the nut 17 is let down to the position in Fig. 3D where the repositioned nut 18 re-engages the cage 15 and supports the load, relieving the rim 23 and nut 17 of load support. Further lowering of the screw may be repeated by repeating the controlled movement of nut 17.

Figure 4A:
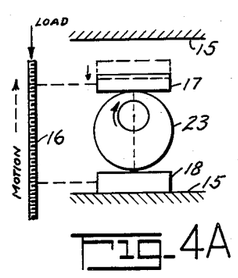
Figs. 4A through 4D are diagrams similar to those in Figs. 3A–3D with a down load on the screw and with the screw being raised.
Figure 4B:
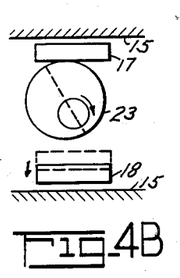
Figure 4C:
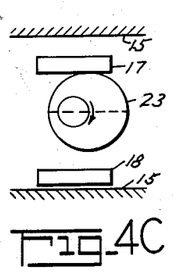
Figure 4D:
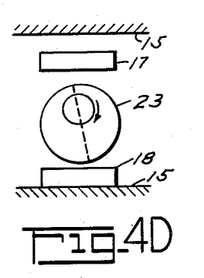

Figs. 4A to 4D show the sequence of events when there is a down load on the screw and when the screw is to be raised. With the down load on the screw the nut 18 rests on the cage 15 during part of the orbit of the rim 23. The nut 17 normally occupies the dotted line position and the rim 23 lifts the load intermittently when it engages the nut. To raise the load, it is necessary to screw the nut 17 down so that the rim engages it earlier. This down position of nut 17 is shown in the solid line position. In Fig. 4B, the rim 23 has raised the nut 17, relieving load from the nut 18. Thereupon, the nut 18 screws down from the dotted line to the solid line position as a result of the action of the assembly 30. As the rim 23 continues to rotate, the nut 17 is lowered until it is disengaged by the rim 23 and the load is transferred to nut as in Fig. 4D. During this sequence, the screw has been raised in its average position by an amount equal to the lowering of the nuts from their dotted line to their solid line positions.

Figure 5A:
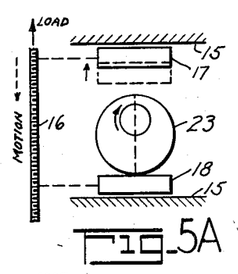
Figs. 5A through 5D are diagrams similar to 3A–3D with an up load on the screw and with the screw being lowered.
Figure 5B:
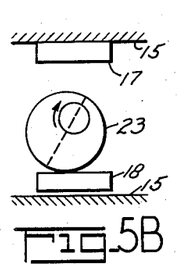
Figure 5C:
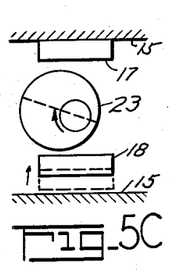
Figure 5D:
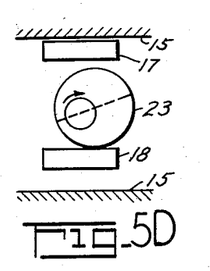

Figs. 5A to 5D show the sequence of operations when the load is up on the screw, and when the screw is to be lowered. With the load in this direction the nut 17 becomes the holding nut and the nut 18, the "lifting" nut. In Fig. 5A, the load presses the nut 18 against the rim 23, and the nut 17 is free to turn. To lower the load the nut 17 is moved up on the screw from its dotted line to its solid line position. As the rim 23 turns the nut 17 holds the load against the cage 15 as in Figs. 5B and 5C, and thereupon the nut 18 becomes free to turn. As in Fig. 5C, the nut 18 moves upward on the screw through the action of the assembly 30 while the load is supported by the nut 17. Continued motion of the rim 23 causes it to pick up the nut 18 and support the load, the load transferring from the nut 17 to the nut 18, thereupon the system resumes its normal action with the screw lowered relative to both nuts.

Figure 6A:
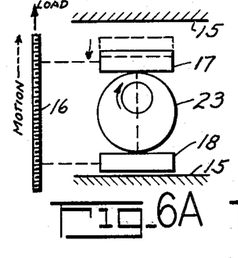
Figs. 6A through 6D are diagrams similar to 3A–3D with an up load on the screw and with the screw being raised.
Figure 6B:
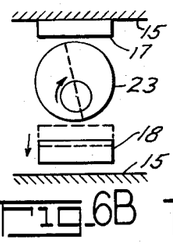

Figs. 6A to 6D show the sequence of operations when there is an up load on the screw and when the screw is to be raised. In Fig. 6A, as in Fig. 5A, the load is supported on the rim 23 through the nut 18, the nut 17 being free to turn. Since the load is to be raised, nut 17 is screwed down on the screw from the dotted line to the solid line positions. In Fig. 6B, the load has transferred from rim 23 and nut 18 to nut 17, the latter resting on the cage 15, leaving the nut 18 free to turn. The nut 18 moves downwardly from the dotted line to the solid line position, through the urging of assembly 30.

Figures 6C, 6D:
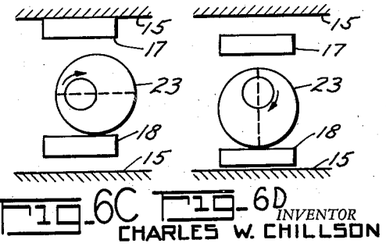

In Fig. 6C, the rim 23 has continued to move and picks up the load on the nut 18. The rim 23 continues its orbit, transferring the load between the nuts 17 and 18 in their new position until a new input signal is imposed.

From close scrutiny, it will be apparent that the following characteristics are inherent in the mechanism. In shifting of the load from the downward to the upward direction, there is backlash in the system, equivalent to approximately one-half of the rise afforded by the rim 23 in the arrangements shown. In moving the screw in the same direction as the direction of the load application, each movement will be equivalent to a fraction of the rise of the rim 23. In moving the screw in a direction opposite to that of load application, the screw movement for each full control cycle will also be equivalent to a fraction of the rise of the rim 23. However, if a lesser increment is desired, it may be secured by appropriate adjustment of the nut 17 on the screw during the interval when said nut is not supporting the load.

Figure 2:
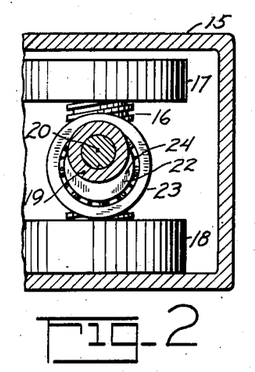
Fig. 2 is a section on the line 2—2 of Fig. 1.

The embodiment of the invention shown in Figs. 1 and 2, together with the modes of operation shown in Figs. 3A to 6D, is principally to show fundamental operating principles of the invention. It has the characteristic that, during the raising or lowering of the load, the load will be continuously oscillated or reciprocated a small portion of the rise of the rim 23. This characteristic may be perfectly tolerable in some applications, but may be undesirable in others. In the subsequent embodiments of the invention, means have been provided to minimize load oscillation or reciprocating during steady-state operation. Also, in subsequent embodiments of the invention to be described, means are provided to minimize load reaction from the centering spring assembly 30 on the control input. The output screw is caused to move in direct proportion to the movement (or linearly) of the control input.

Figure 7:
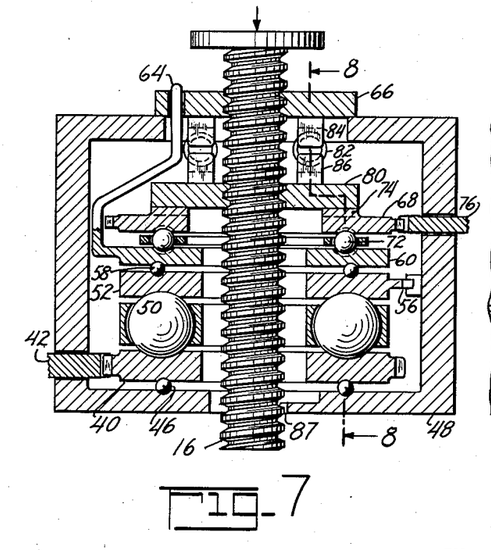
Fig. 7 is a longitudinal section through an alternative embodiment of the invention adapted for one direction of loading.
Figure 8:
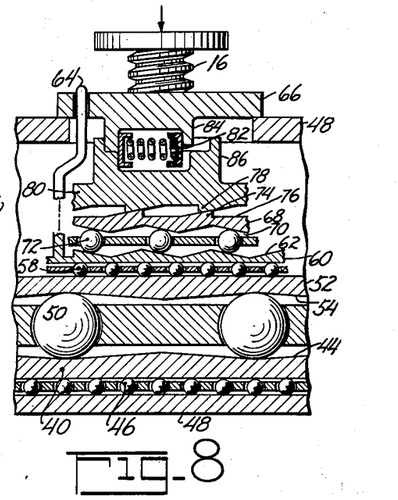
Fig. 8 is a developed fragmentary section on the line 8—8 of Fig. 7.

Reference may now be made to Figs. 7 and 8 which show an alternative form of the mechanical servo mechanism which is adapted for the support of a uni-directional load and which is controllable to raise or lower the load. When the terms "raise" and "lower" are used, they merely refer to the directions shown in the drawings. The load direction may actually be in any direction with appropriate disposition of the mechanism with its axis in alignment with the load direction.

In this and in subsequent arrangements of the mechanism, power reciprocation in the mechanism is secured from a set of waved cams separated by balls. In Figs. 7 and 8 an annular member 40 is provided with gear teeth in its rim which are driven by a power input gear 42. The top face of the member is waved as at 44 and the member is supported on a thrust bearing 46 engaging a stationary housing 48. Suitably retained balls 50 are located on the waved cam 44 and over the balls, a member 52 is disposed having a waved cam on its lower face at 54. Member 52 is constrained from rotation by a key 56. As the member 40 is driven rotationally, its cam track 44 rotates relative to the cam track 54, and, due to the presence of the interposed balls 50, the member 52 is caused to rise and fall cyclically.

Alternatively, one of the tracks 44 or 54 may be flat to secure the same reciprocating effect. When both tracks are waved, the balls 50 must be controlled relative to the tracks by suitable means, so that the tracks will always move to peak-to-peak and valley-to-valley relation.

The upper face of the member 52 is formed with a ball race engaged by thrust ball bearings 58 upon which is located an annular member 60 whose upper face is wave-formed as at 62. This member 60 is also provided with a drive pin 64 which engages an upper holding nut 66 which normally rests upon the housing 48. Above the member 62 is a control input member 68 of annular form having waves 70 on its lower face which face the waves on the member 60. A series of balls 72 are interposed between the waves 62 and the waves 70.

The control member 68 is provided with gear teeth 74 on its rim engaged by a control input pinion 76. Entering the mechanism through an opening in the housing 48 the member 68 may be rotated, during the part of the operating cycle when the load is supported by the nut 66, in either direction accordingly as it is desired to raise or lower the load supported by the screw 16. The upper face on the member 68 is provided with a series of ramp elements 74 alternating with flats 76; engageable with these ramps and flats are ramps 78 formed on the lower face of a nut 80 which threadedly engages the screw 16. The holding nut 66 and the nut 80 are coordinated in their relative rotational movement by a spring 82 engaged between abutments 84 on the nut 66 and abutments 86 on the nut 80. It should be fairly obvious that the spring 82 urges the nuts 66 and 80 to a certain relationship. Departure from this certain angular relationship is allowed to a limited extent so that the nuts may be angularly displaced from one another in either direction. The spring 82 and associated abutments serve the same purpose as the assembly 30 shown in Fig. 1. The screw 16 is constrained from rotation as by a key 87 on the housing engaging a keyway along the screw.

The arrangement in Fig. 8 is shown with the control member 68 rotated to produce raising of screw 16. When the race 52 is near its lowermost position and the load is supported by nut 66, the control member 68 may be moved in either direction freely without any resistive load acting against it.

As shown, the control member 68 has been moved to the left, whereupon the valleys of the waved surfaces 70 are displaced to the left relative to the valleys of the waved surfaces 62. Concurrently, the ramps 74 are moved leftwardly relative to the ramps 78 wedging members 68 and 80 apart. As the member 52 rises as a result of the action of the balls 50 on the tracks 44 and 54, lifting force is transmitted through the balls 72, through the ramps 74 and 78, to raise the nut 80 and thus to raise the screw 16. The lifting force tends to restore the valleys of the waved tracks 70 and 62 to opposition thereby exerting torque upon the member 60 tending to turn it in a leftward direction. This leftward turning is prevented by pin 64 and its engagement with the nut 66 until the nut 80 has lifted the load and freed the nut 66 from load support. When the nut 66 is free, the member 60 may turn leftwardly and drive the nut 66 in a leftward direction, or down the screw. However, the lifting force is still being exerted on the nut 80 through the ramps 74 and 78. As the pulsing member 52 passes its uppermost position, the load will be transferred from the nut 80 to the nut 66 when it re-engages the housing 48 according to its new location on the screw 16. When the nut 80 is free of load it will be shifted downwardly on the screw to a new position corresponding to the new position of the nut 66, this action being induced by the centering spring 82. This sequence restores the system to its original condition but with the screw 16 raised and further cycling of the pulsing member 52 produces no net raising or lowering until a new input signal is placed upon the control member 68.

When no control signal is imposed on the mechanism, the pulsing member 52 will rise and fall without materially affecting rise and fall of the load, the load being held by the holding nut 66. However, ramps 74 and 78 and the flats 76 are so related as to produce slight axial interference, so when the pulsing member 52 rises to its peak, the nut 80 will be raised a slight amount, relieving the load from the holding nut 66. This relationship is essential in order to enable lowering of the load which will now be described.

To lower the load, the control member 68 is moved rightwardly from the position shown in Fig. 8 so that the ends of ramps 78 engage portions on the flat 76 of the member 68. The rightward movement of the member 68 disposes the valleys of the waved face 70 thereof to the right of the valleys of the waved faces 62. When the pulsing member 52 now raises to its peak, the load is assumed by the nut 80 and also a torque is imposed on the member 60 urging it toward the right due to the relationship of the slope of the waved faces 70 and 62. This torque is transmitted through the pin 64 to the nut 66 screwing the nut 66 up the screw, the nut 66 at this point being unloaded and free to turn due to support of the load by the nut 80. Since the nut 66 is clear of the housing 48 and since the pulsing member 52 is near its peak, lowering of the pulsing member 52 will let the then non-rotating nut 80 down as the pulsing member 52 moves down, thus lowering the screw 16. Near the bottom of the cycle of the member 52, the nut 66 re-assumes the load and is restrained from rotation, leaving the nut 80 free to rotate.

The centering spring 84 then rotates the nut 80 in an upward direction on the screw to the neutral position through the action of the centering spring 82. This restores the system to its normal position with the screw lowered, and no net upward and downward movement of the screw 16 will again take place until a new control movement is imposed upon the control member 68.

The mechanism just described may be called a "series" servo system since the torque required to turn the holding nut up or down on the screw when it is free of load is derived from the load itself. In this connection, it will be noted that the torque loading sub-system is comprised of the elements 62, 70, and 72 which are disposed in series between the pulsing member 52 and the load-lifting wedges and flats 74, 76 and 78. The depth of the waves in the surfaces 62 and 70 is exaggerated in the drawings for better appreciation of function; in actuality, these waves would be made shallow so that their action will result in minimum encroachment on the lift available from the pulsing member 52.

Figure 9:
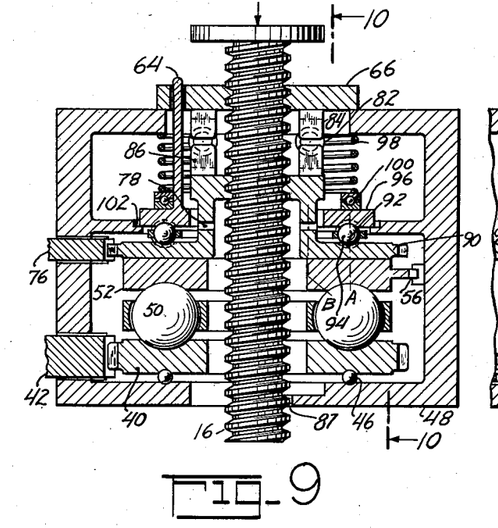
Fig. 9 is a longitudinal section through an alternative embodiment of the invention adapted for uni-directional loading.
Figure 10:
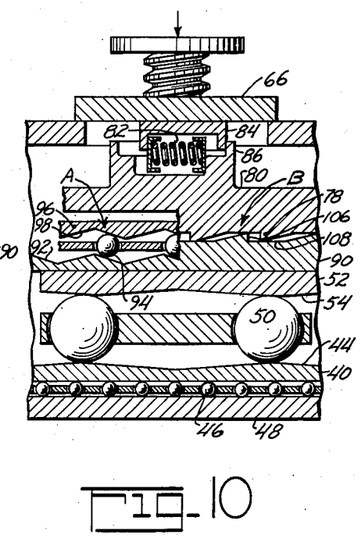
Fig. 10 is a developed fragmentary section on the line 10—10 of Fig. 9.

Figs. 9 and 10 show a modification of the mechanism which incorporates a "parallel" servo in lieu of the "series" torque servo of Figs. 7 and 8. Some of the components in Figs. 9 and 10 are virtually identical with those in Figs. 7 and 8 and the same characters are applied. The pulsing member 52, for instance, accomplishes the same purpose as the corresponding pulsing member in Figs. 7 and 8.

In Figs. 9 and 10, the control input member is designated 90 and is engaged at times by the pulsing member 52. It is driven by an input pinion 76. An outer annulus 92 on the member 90 is formed with waved tracks engaged by balls 94. An upper element 96 having waved tracks 98 on its lower surface is also engaged by the balls 94. The upper member 96 is spring pressed downwardly by spring 98 acting through a thrust bearing 100. The member 96 is constrained against extreme downward movement by a ridge 102 formed on the housing 48. The member 96 further is provided with a pin 64 coupling it to holding nut 66. When controlled rotation is imposed on control member 90 during intervals when the pulsing member 52 is below its peak position, and when the holding nut 66 carries the load, the member 96 is held from contact with the member 90 by the ridge 102 whereby the member 90 may be turned freely. However, when the pulsing member 52 raises, the member 96 is urged downward by the spring 98 and the spring will then impose a turning force on the member 96 as a result of the offset relation as shown in Fig. 10 of the waves 92 and 98. This turning force is transmitted through the pin 64 to the nut 66, exerting torque on the nut causing turning of the nut 66 when it is freed from the load. The turning of the nut 66 will be in a direction according to the control direction imposed on the control member 90.

An inner annulus on the control member 90 is provided with ramps 106 and flats 108 analogous to the ramps and flats 74 and 76 of Fig. 8. These cooperate with ramps 78 formed on the lifting nut 80, these elements being similar to the corresponding elements in Figs. 7 and 8. Also, corresponding nuts 66 and 80 of Figs. 9 and 10 are urged to a neutral angular relationship by a spring 82, and the nuts are limited in their relative angular displacement by the abutments 84 and 86.

Returning to the operation of this arrangement, it has already been stated that the spring 98 exerts a turning force on the nut 66 though the action of balls 94 and waved tracks 92 and 98. Concurrently, as the torque is exerted, the lifting force from the pulsing member 52 is transmitted through the control member 90 and the ramps and flats thereof, lifting nut 80. Fig. 10 shows flats 108 moved to the right relative to the ramps 78 to induce lowering of the load, torque on the nut 66 concurrently being imposed to screw the nut 66 up on the screw. As described before, in connection with the embodiment of Figs. 7 and 8, the peak of the pulsing member 52 lifts the nut 80 and thus lifts the load, freeing the holding nut 66 for rotation. The torque imposed thereon moves the nut 66 up the screw. As the pulsing member 52 lowers, nut 80 lowers therewith until such time as the holding nut 66 re-engages the housing 48 and leaves the nut 80 free of load. When the nut 80 is freed, the centering spring 82 rotates the nut 80 up on the screw to match the rotational position of the nut 66 whereupon no further raising or lowering of the load occurs until a new control impulse is inserted through the control member 90.

Lifting of the load involves moving the control member 90 to the left from the position shown in Fig. 10 so that the ramps 78 and 106 engage one another and causing lifting of the load when the pulsing member 52 raises from a lower point toward a high point. The action in this situation is substantially the same as that described in connection with Figs. 7 and 8.

In both of the arrangements of Figs. 7-10, the interference between the ramps 78 and the flats such as 76 and 108 is of sufficient magnitude to lift the screw, through the nut 80, and to free the holding nut 66, when the screw 16 is loaded to the capacity of the mechanism and the parts of the assembly are correspondingly fully deflected as a result of the load. Further, this interference must include allowance for wear. Wear accumulates principally in the thrust bearing 46, in the waved cams 44 and 54, and in the balls 50 since these are the only parts of the system which are moving during operation of the system and lifting or lowering of the load. The other components do not move relative to one another under load and therefore are subject to minimum wear.

Figure 11:
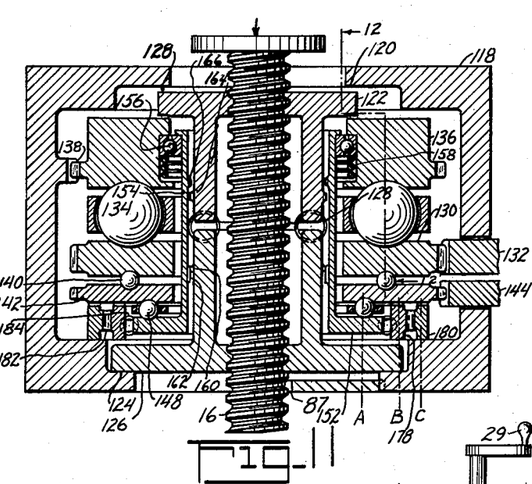
Fig. 11 is a longitudinal section through an alternative embodiment of the invention adapted for bi-directional loading.
Figure 12:
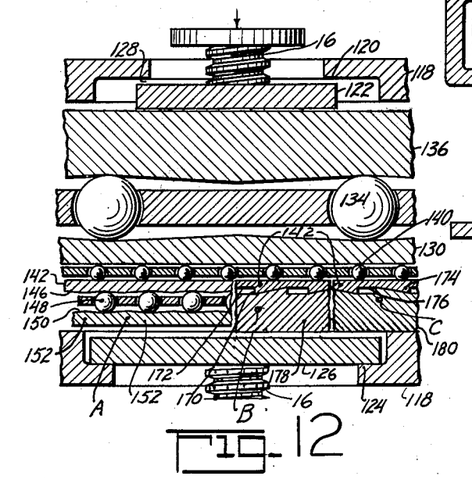
Fig. 12 is a section generally on the line 12—12 of Fig. 11, but showing regions A, B and C corresponding to section lines A, B and C on Fig. 11.

Reference may now be made to Figs. 11 and 12 which show the mechanical servo mechanism of the invention arranged in such fashion that the load on the screw 16 may be in either direction and, by appropriate movement of the control member, the screw may be moved in either direction regardless of the direction of application of the load. While many of the components in this embodiment are similar to those in other embodiments already described, a new series of reference characters (except for screw 16) will be used to avoid confusion. The screw 16 passes through a housing 118 which is normally fixed. The housing provides an upper abutment 120 against which a nut 122 may at times bear when said nut is serving as a holding nut. The housing is also provided with an abutment 124 against which a nut 126 may at times bear when the latter serves as a holding nut. Abutment 120 and nut 122 engage for holding purposes when the axial load on the screw is upward, while abutment 124 and nut 126 serve for holding purposes when the load is downward on the screw. There is a certain amount of backlash upon load reversal represented by clearance 128. The two nuts 122 and 126 are coordinated to normally maintain the same phase relationship by centering springs 128 which are similar to the springs 82 in prior embodiments and which are arranged as in prior embodiments to limit the relative turning of the nuts with respect to each other, but always to exert torque between the nuts which will bring them into the neutral phase relationship shown.

Within the housing 118 and embracing the shanks on the nuts 122 and 126, are a series of annular members. The first of these is a rotary power input member 130 driven by a power gear 132, the member 130 having waved cam track on its upper face as shown. Upon the cam track are a series of balls 134 and upon the balls is an annular member 136 whose lower face is formed with a cam track similar to that formed on the member 130. The member 136 is constrained from rotation relative to the housing by a keying device 138. As the member 130 is power-rotated it should be clear that the members 130 and 136 will move axially relative to each other in pulsing fashion to expand and contract the over-all assembly. The top face of the member 136 may at times engage the face of the nut 122 to exert lift when the load is down on the screw. When the load is up on the screw, the top face of the member 136 engages the housing 118 to provide reaction. Beneath the lower face of the member 130 is a thrust bearing 140 cooperating with a control input member 142 which may be rotated selectively in either direction by a control input gear 144 meshed with teeth on the periphery thereof. The lower face of the member 142 at the annular zone A is formed as a waved race 146 which cooperates through balls 148 with waves 150 on the upper face of a flange 152. This flange is integral with a hub sleeve 154 which extends upwardly within the member 136 to a junction with the inner race of a ball bearing 156. The outer race of this bearing is seated in a groove in the member 136 and is spring pressed upwardly relative to the member 136 by a spring 158. These elements are so arranged that the spring 158 acts to load the flange 152 toward the control member 142 but the outer race of the bearing 156 bottoms against the end of the groove in the member 136 before the elements 152 and 142 are at minimum distance apart, where balls 148 are at the valleys of the waves 146 and 150.

These elements just described are analogous to the loading spring 98 in Fig. 9 and associated parts and they serve, when the mechanism calls for lifting or lowering of the load, to impose torque on one or the other of nuts 122 and 126 to induce turning thereof when the engaged nut is free to rotate. Coupling of the sleeve 154 to the appropriate nut is accomplished by key or spline connections. When the load is down on the screw 16, the nut 126 serves as the holding nut and is in its lowermost position. A key 160 on this nut now engages a key 162 on the inside of the sleeve 154. When the load is upward on the screw 16, the nut 122 moves to its uppermost position whereupon a key 164 on the nut engages a spline 166 on the inside of the sleeve 154. Either the key 160 is engaged with the spline 162 or the key 164 is engaged with the spline 166, there being no free zone where no connection exists.

On the lower face of the control input member 142, respectively at annular zones B and C, wedge ramps and flats are formed as also shown in zones B and C of Fig. 12. In zone B the ramps and flats are respectively noted as 170 and 172. In zone C the ramps and flats are respectively noted as 174 and 176. The ramps 170 are opposite in slope to the ramps 174. In zone B an annular member 178 is introduced, formed on its top face with ramps and flats complementary to the ramps and flats 170 and 172. In zone C is an annular member 180 formed on its upper face with ramps and flats complementary in form to the ramps and flats 174 and 176. The members 178 and 180 are splined together at 182 to secure them from relative rotation and both are urged to a neutral position relative to the sleeve 154 by a spring restrainer 184 operating between one of the members, such as 178, and the sleeve 154. The spring restrainer 184 allows angular movement of the annular members relative to the wedges on member 142. The member 178 acts as an adjustable spacer between control member 142 and the nut 126 and assumes the load when the load direction on the screw 16 is upward, that is when such load is upward the rim of the nut 126 engages the lower face of the member 178. When the load on the screw 16 is in a downward direction, the control member 142 bears at times on the member 180 which in turn abuts against an adjacent portion of the housing 118.

Assuming the load on the system is in a downward direction the mode of operation of the mechanism will now be described. The member 130 rotates continually and causes cyclic axial pulsing between the members 130 and 136. During one portion of the cycle of operation the load is supported by the nut 126 on the housing abutment 124. When the members 130 and 136 are almost fully opened the member 136 engages the nut 122 to lift it slightly to assume the load and relieve the nut 126 of the load. At this time reaction to the lifting is from the member 130 through the thrust bearing 140 and the control member 142 to the annular member 180 and thence to the housing. When the control input member 142 is rotated in a direction to raise the load by causing the ramp 174 to engage its co-acting ramp and to wedge the elements 142 and 180 apart, the pulser member 136 engages the nut 122 early and raises it a substantial amount. The control input signal at this time also creates torque on the member 152 as a result of the waved surfaces 146 and 150 and the spring 158, which torque is transmitted to the nut 126 tending to twist it down on the screw 16.

Movement of the nut due to the torque may not occur until the nut is freed of its load. As the pulser lifts the upper nut 122, nut 126 is free to move and does so, turning down on the screw. The pulser expands to raise the loaded nut 122 to near the peak of its travel and the load is then returned to the nut 126 as it engages the housing, relieving the nut 122 of the load and leaving it free to turn. The nut 122 is then turned to the same position as that of the nut 126 through the action of the centering spring 128. When the annular member 180 is freed from load by the nut 126 engaging the housing, the member 180 is turned to a neutral position by the centering spring 184.

As the control input 142 is moved to call for lowering the load, the load still being downward on the screw, the ramps 174 in zone C are moved along the flats, this movement of the control member 142 also creating a torque which is imposed on the nut 126 as previously described. As the pulser reaches its nearly expanded position, the member 136 engages and lifts the nut 122 a small amount, and leave the nut 126 free to turn under the influence of the torque on the nut, which then turns nut 126 up on the screw, away from the bottom of the housing, at the same time compressing spring 128. As the pulser contracts the load continues to be supported on the nut 122 and on the member 136 until considerable contraction has occurred. Thereupon, the load is restored to the re-positioned holding nut 126. When the load is fully assumed by the nut 126, the nut 122 is free to turn and is turned upwardly on the screw by the centering spring 128 to the point where the two nuts 126 and 122 are in their neutral relationship. When the load is re-assumed by the nut 126, the annular member 180 is freed from load and is restored to the neutral position relative to the control member 142 by the centering spring 184. During both lifting and lowering of the load, with the load downward on the screw, the reaction force is taken through the annular member 180 at times when the nut 122 is carrying the load.

When the load is upward on the screw, the member 180 disengages from the housing 118 and the nut 126 engages the annular member 178. The load is then supported either by the nut 122 resting on the housing abutment 120, or by a nut 126 bearing on member 178, in turn being carried by the members 142, 140, 130, 134 and 136, the latter resting on an upper internal pair of the housing 118. With the shift in load direction, the key 160 on the nut 126 disengages the spline 162 on the sleeve 154 and the key 164 on the nut 122 engages the spline 166 on the sleeve 154. When control rotation is imposed on the control member 142, the ramps 170 move with respect to the co-acting ramps on the member 178, holding them in the same axial space relationship when load raising is called for and wedging them apart when load lowering is called for. If load lowering is called for member 178 moves down relative to member 142 and as pulsing progresses the member 178, engaged with the nut 126, forces it down against the load. This frees the nut 122 from engagement with the housing and because of the torque created from the waved surfaces 146 and 150, twisting of the sleeve 154 is transmitted to the nut 122 through the key 164 to turn the nut 122 up on the screw. As the pulsing cycle continues and contraction occurs, load is restored to the nut 122 and to the housing 118, the nut 126 is freed and is returned to neutral phase relationship relative to the nut 122 by the centering springs 128. When load raising is desired, with the load upward on the screw, the member 178 engages the nut 126 near the peak of the expansion pulse, forcing the load down a slight amount and relieving the nut 122 of the load. The torque imposed as a result of the control action then turns the nut 122 down on the screw, the screw being permitted to move upwardly, with the nut 126 engaging the member 178 as the pulsing mechanism contracts. This movement occurs until the nut 122 re-engages the housing relieving the nut 126 of the load. The nut 126, now being free, moves downwardly on the screw as a result of the action of the centering springs 128, restoring the mechanism to the neutral condition. The centering spring 184 acting between the sleeve 154 and the annular member 178 urges the member 178 to the neutral position relative to control member 142 when the load is held by the nut 122.

In the embodiment of Figs. 7–12 the load bearing ramps such as 170, 174, 78 and 74 are constructed at an angle which is less than the friction angle of the co-acting parts so that they will not slip relative to each other when they are bearing the load.

For best operation, the advance of the different nuts along the screw for a specific angle of nut rotation on the screw should be substantially the same as the advance created by the rotational displacement of the several wedge members. In control movement of the control member of any of the systems shown, such movements may be to the maximum angular extent allowed by the limited angular movement of the nuts to gain maximum up or down movement of the screw with each cycle of operation. However, if control movements are less than the maximum, the axial movement of the screw will be proportional thereto. In other words, infinitesimal increments or decrements of screw movement may be secured with infinitesimal movements of the control member. This points up one of the outstanding advantages of the present mechanism in that the control steps may be of any magnitude from small to large with corresponding steps of the output member of the system. This distinguishes over other devices such as ratchets and the like in which there is always a minimum motion step, rather than an infinitesimal motion step.

The forms of reciprocating pulsing mechanisms may be different from those shown an described; any mechanism to provide cyclic reciprocating pulses may be adapted. Incidentally, when ballramp movements are used, either as pulsers, or as loading devices to secure torque for rotating nuts when they are not under load, synchronizers are ordinarily needed to time the balls relative to the peaks and valleys of the cooperating races so they will always remain in the required relation.

As to the torque loading devices, it is feasible to construct them without a spring loader and rather, design and construct them so precisely that the torque loading on the nuts will be positive and will result from the axial load on the mechanism. Spring loading is considered desirable, however, as it widens the range of clearances and tolerances in the design and construction of the mechanisms.

The description has not dwelt on dimensions, clearances, spring rates, screw pitch and the like, as it is deemed to be well within the scope of the skilled designer to evaluate these factors to evolve a fully operative and efficient mechanism. It may be pointed out, however, that the force available to provide turning torque on the nuts, when free, and on the annular members such as 178 and 180, must be adequate to turn them without undue time lag, even though they are turned when unloaded. Consideration must be given to the inertia of the elements and to the speed and angular movement which is expected of them when the mechanism is operating. It is intended that the pulsing and control components can be operated at several hundred or more cycles per minute so that rates of controlled movement of the screw output member may be of the order of several inches per second, or even several feet per second, for a mechanism of moderate size.

Fast advance, reversible screws and nuts may be used if necessary; irreversibility can be secured due to the frictional engagement of lifting and holding nuts respectively with non-rotating lifting and reaction components.

In design, full consideration must also be given to deflections of parts under load, particularly to enable the establishment of the clearance relationships needed for smooth action of the mechanism and for long life thereof.

The principles of the mechanism can be applied in many different ways and, as previously mentioned, the embodiments shown are merely exemplary. The scope of the invention is not to be limited by the specific examples shown. Rather, reference should be had to the following claims for a definition of the scope of the invention.

I claim:

1. A mechanical servo mechanism comprising power input means, a pulsing reciprocating driving member operatively connected to the power input means, a controllably movable transmitting device engageable at times with the driving member, a driven member drivably connected with and movable by said transmitting member when the transmitting member is in load-bearing relation between said driving and driven members, and a controllably movable supporting device connected with and supporting said driven member in the pulse intervals when said transmitting member is in load-free relation between said driving and driven members.

2. A mechanical servo mechanism comprising power input means, a pulsing reciprocating driving member operatively connected to the power input means, a controllably movable transmitting device engageable at times with the driving member, a driven member drivably connected with and movable by said transmitting member when the transmitting member is in load-bearing relation between said driving and driven members, a controllably movable supporting device connected with and supporting said driven member in the pulse intervals when said transmitting member is in load-free relation between said driving and driven members and means to elastically connect said transmitting and supporting devices for movement in like sense as they are respectively in load-free relation between said members.

3. A mechanical servo mechanism comprising power input means, reciprocating driving means operatively connected to the power input means, a transmitting device drivably connected at times with the driving means, a driven member, said driving member moving said driven member at times through said transmitting device, a supporting device drivably connected with the driven member when said transmitting member relinquishes load-bearing relation therewith, and means selectively operable to advance and retard said transmitting and supporting devices respectively as they are free of load-bearing engagement with said driven member.

4. A mechanical servo mechanism comprising power input means, reciprocating driving means operatively connected with the power input means, a transmitting device drivably connected at times with the driving means, a driven member, said driving member moving said driven member at times through said transmitting device, a supporting device, drivably connected with the driven member when said transmitting member relinquishes load-bearing relation therewith, and means selectively operable to advance and retard said transmitting and supporting devices respectively as they are free of load-bearing engagement with said driven member, said driven member comprising a screw shaft, said transmitting and supporting devices comprising nuts engaging the screw shaft threads, and said selectively operable means comprising a unit control connected to at least one of said devices operable to urge rotation of said nuts on said shaft.

5. A mechanical servo mechanism comprising a continuously driven reciprocating member, a screw shaft aligned in the direction of reciprocation, a nut engaging the screw shaft, control means movable to connect said member to translate said nut and said shaft in the reciprocating direction, a second nut engaging the screw shaft, a support against which said second nut is adapted at times to rest, a resilient rotational driving connection from said control means to said second nut to rotate the latter when free from said abutment, and a resilient rotational driving connection from said second nut to said first nut to rotate the latter when the first nut is free from axial translation by said reciprocating member.

6. A mechanical servo mechanism comprising a continuously driven reciprocating member, a screw shaft aligned in the direction of reciprocation, a nut engaging the screw shaft, control means movable to connect said member to translate said nut and said shaft in the reciprocating direction, a second nut engaging the screw shaft, a support against which said second nut is adapted at times to rest, a resilient rotational driving connection from said control means to said second nut to rotate the latter when free from said abutment, and a resilient rotational driving connection from said second nut to said first nut to rotate the latter when the first nut is free from axial translation by said reciprocating member, said control means comprising a ring having a waved annular cam face thereon, said ring being rotationally controllable, a co-acting ring having a waved annular cam face facing said first face, anti-friction means rollable on said faces, one of said rings having thrust engagement with said nut and the other with said member.

7. A mechanical servo mechanism comprising a continuously driven reciprocating member, a screw shaft aligned in the direction of reciprocation, a nut engaging the screw shaft, control means movable to connect said member to translate said nut and said shaft in the reciprocating direction, a second nut engaging the screw shaft, a support against which said second nut is adapted at times to rest, a resilient rotational driving connection from said control means to said second nut to rotate the latter when free from said abutment, a resilient rotational driving connection from said second nut to said first nut to rotate the latter when the first nut is free from axial translation by said reciprocating member, and means to limit the angular movement of one nut relative to the other.

8. A mechanical servo mechanism comprising a continuously driven reciprocating member, a screw shaft aligned in the direction of reciprocation, a nut engaging the screw shaft, control means movable to connect said member to translate said nut and said shaft in the reciprocating direction, a second nut engaging the screw shaft, a support against which said second nut is adapted at times to rest, a resilient rotational driving connection from said control means to one of said second nuts to rotate the latter when free from said abutment, a resilient rotational driving connection from one said nut to the other said nut to rotate the latter when the one said nut is free from axial translation by said reciprocating member.

9. A mechanical servo mechanism comprising power input means, a continuously driven reciprocating member operatively connected with the power input means, an output member movable in the direction of reciprocation, a first and a second element each drivably engageable with the output member at times, to be secure therewith in the direction of reciprocation, a support engageable by the second element at times to hold the element and the output member from movement, a control device selectively operable to connect said reciprocating member with said first element for translation thereof and of said output member, and means connecting said first and second element and controlled by said control member to move said first and second elements to new positions on the output member when respective elements are disengaged from drivable engagement with said output member.

10. A mechanical servo mechanism comprising power input means, a continuously driven reciprocating member operatively connected with the power input means, an output member movable in the direction of reciprocation, a first and a second element each drivably engageable with the output member at times, to be secure therewith in the direction of reciprocation, a support engageable by the second element at times to hold the element and the output member from movement, a control device selectively operable to connect said reciprocating member with said first element for translation thereof and of said output member, means connecting said first and second elements and controlled by said control member to move said first and second elements to new positions on the output member when respective elements are disengaged from drivable engagement with said output member, said output member comprising a screw, said first and second elements comprising nuts engaging the screw threads, said first nut when moving said output member being non-rotatable relative thereto, said second nut when supporting said output member being non-rotatable relative thereto, and both nuts at times when they are unloaded from said output member being rotated by said connecting means to move along said screw output member.

11. A mechanical servo-mechanism comprising power input means, a continuously driven reciprocating member operatively connected with the power input means, a screw shaft aligned in the direction of reciprocation, a nut engaging the screw shaft and rotatable thereon, control means to connect said nut controllably with said member whereby the nut and screw shaft are translated with the member, a second nut engaging the screw shaft and rotatable thereon, a support with which said second nut engages at times to prevent axial movement thereof and of said shaft, and resilient turning connections from said first nut to said second nut.

12. A mechanical servo mechanism comprising a screw shaft, a continuously reciprocating member reciprocable in the direction of the shaft axis, two axially spaced nuts whose threads engage the threads of said shaft, a face cam ring embracing said shaft and having a waved cam face thereon, means selectively operable during the continuous operation of the reciprocating member to apply controlled rotational movement to said ring, a waved cam ring facing said face cam ring having waves therein corresponding to the waved cam face of said face cam ring, said latter ring being reciprocable at times by said member, a thrust connection from said face cam ring to one of said nuts, a rotational driving connection from said waved cam ring to the other said nut, a resilient rotational driving connection from the other said nut to the first nut, and a fixed abutment engageable at times by said other nut.

13. A mechanical servo mechanism comprising a screw shaft, a reciprocating pulser, a cage engaged at one end by said pulser, a first nut engaging said screw, an adjustable controllable expansible device between said pulser and said nut whereby said device is adjustable to transmit reciprocation of said pulser to said nut, a second nut engaging said screw and engageable at times with said cage, and resilient means urging said two nuts to a certain rotational position relative to each other.

14. A mechanism according to claim 13 including a control input element connected to said expansible device to control the expansion thereof, and including a resilient rotational driving connection to said first nut.

15. A mechanism according to claim 13 including a control input element connected to said expansible device for moving same, a member rotationally drivably engaged with one of said nuts, said member and said device having facing waved tracks thereon, balls between said tracks, and resilient means operable to load said tracks toward one another to urge said tracks to a certain relative rotational position.

16. A mechanism according to claim 13 wherein said expansible device comprises ramps, there being co-acting ramps on the first said nut, said device including a wave faced cam, another member having a wave faced cam facing the first wave faced cam, rollers between said cams, a rotary driving connection from said another means to the other of said nuts.

17. A mechanism according to claim 13 wherein said expansible device comprises a ramp on the first said nut, a member having co-acting ramps facing said first ramps and comprising a control input, said member being engageable by said reciprocating pulser, said member having a waved cam race thereon, another member having a wave faced cam facing the first cam, rollers between said cams, means to spring-load said wave faced cams toward one another, and a rotational driving connection from said another member to the other of said nuts.

18. A mechanical servo mechanism comprising a screw shaft, a support, two nuts associated with said support engaging said screw, one of said nuts at times bearing on said support, power input means, a reciprocable-pulser operatively connected to the power input means and reacting at one end on said support, and control mechanism between said pulser and said other nut operable selectively to connect said pulser for various degrees of movement of said other nut, said mechanism including means to impose turning torque on at least one of said nuts concurrently with the indicated pulsing connection.

19. A mechanism according to claim 18, including resilient means urging said nuts to a uniform rotational phase relation with each other.

20. A mechanical servo mechanism comprising a screw shaft; a support; two nuts associated with said support engaging said screw, one of said nuts at times bearing on said support; a reciprocable pulser reacting at one end on said support; a control mechanism between the pulser and said other nut operable selectively to connect said pulser for various degrees of movement of said other nut; and resilient means urging said nuts to a uniform rotational phase relation with each other; said control mechanism comprising relatively rotationably wedge elements to vary the axial spacing therebetween, a waved cam on one of the said elements, a waved cam annulus opposite the said waved cam, rollers therebetween, resilient means urging said cam element toward said waved cam annulus, and a rotational driving connection from said waved cam annulus to one of said nuts.

21. A mechanical servo mechanism comprising a screw shaft; a support; two nuts associated with said support engaging said screw; one of the said nuts at times bearing on said support; a reciprocable pulser; control mechanism between said pulser and said other nut operable selectively to connect said pulser for various degrees of movement of said other nut; said mechanism including means to impose turning torque on at least one of said nuts concurrently with the indicated pulsing connection; and resilient means urging said nuts to a uniform rotational phase relation with each other; the control mechanism being adapted for load reversal on said screw and including a coupling between one or the other of said nuts and the said means to impose turning torque responsive to load direction, and alternative wedge elements operative respectively according to load direction on the screw as a reaction element between said pulser and said support and as a lifter between said pulser and one of said nuts.

22. A mechanical servo mechanism comprising power input means, reciprocating driving means operatively connected to the power input means; a member aligned in the direction of reciprocation driven by the reciprocating means; support means; a pair of controllably movable devices on said member; the member being biased by a load thereon to a position in which one of the devices is loaded against the support means, said other device being actuated by the driving means periodically to assume the load from said one device; selectively operable means for translating the position of a device when unloaded on the member; and resilient means connecting the devices to adjust the position of the other device on the member when free of load.

23. A mechanical servo mechanism comprising power input means, a pulsing reciprocating driving member operatively connected to the power input means; a controllably movable transmitting device engageable at times with the driving member; a driven member drivably connected with and movable by said transmitting member when the transmitting member is in load-bearing relation between said driving and driven members; a controllably movable supporting device drivably connected with and supporting said driven member in the pulse intervals when said transmitting member is in load-free relation between said driving and driven members; and control means connected to one of said devices operable to move said devices in opposite directions to effect driven member movement in one and the other direction.

References Cited in the file of this patent
UNITED STATES PATENTS

| | | |
|---|---|---|
| 2,151,094 | Fiorentino | Mar. 21, 1939 |
| 2,583,775 | Hyde | Jan. 29, 1952 |